(No Model.) 2 Sheets—Sheet 1.
A. JOHNSON.
MACHINE FOR DISTRIBUTING FERTILIZERS.
No. 302,143. Patented July 15, 1884.
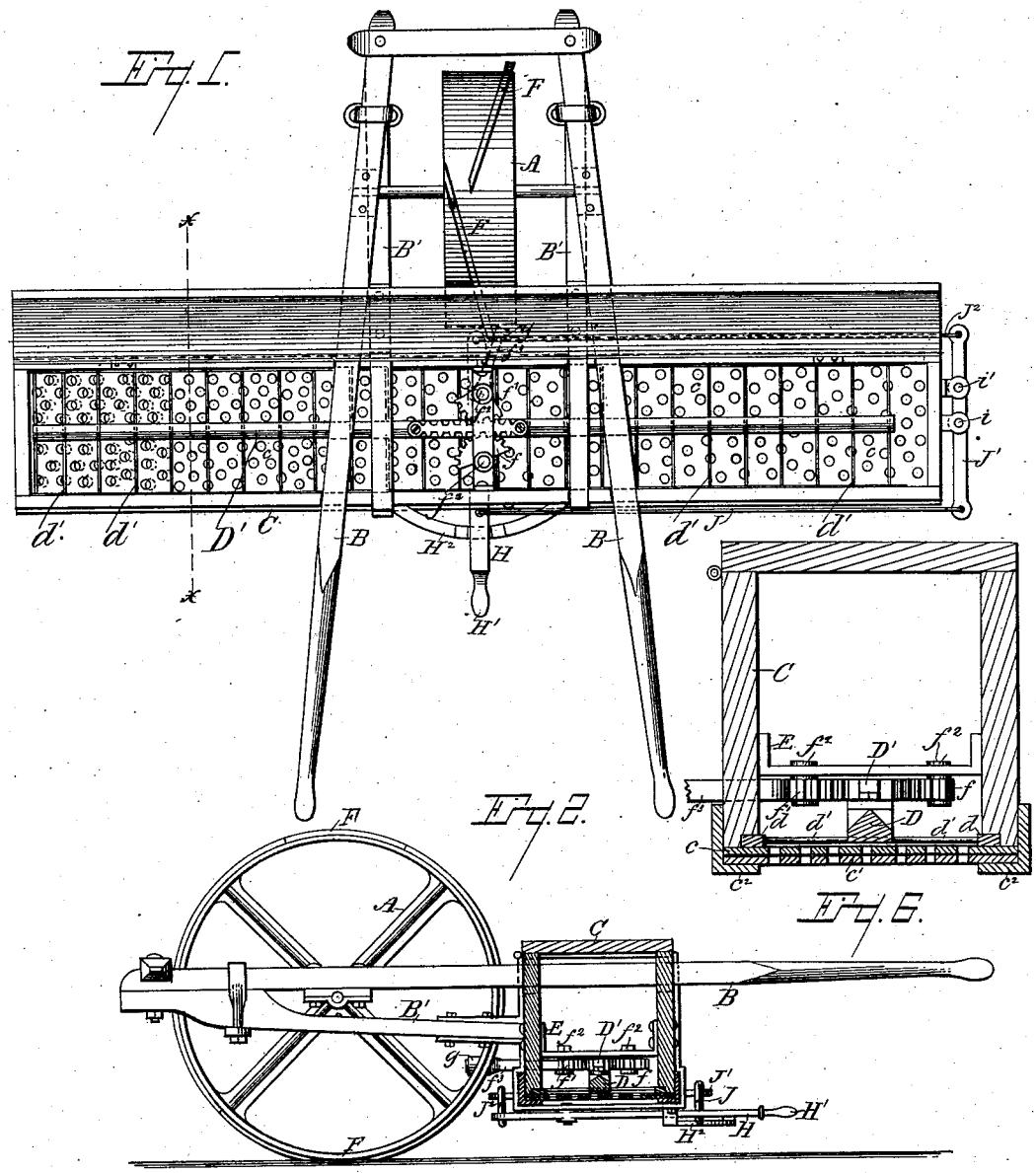

(No Model.) 2 Sheets—Sheet 2.
A. JOHNSON.
MACHINE FOR DISTRIBUTING FERTILIZERS.
No. 302,143. Patented July 15, 1884.
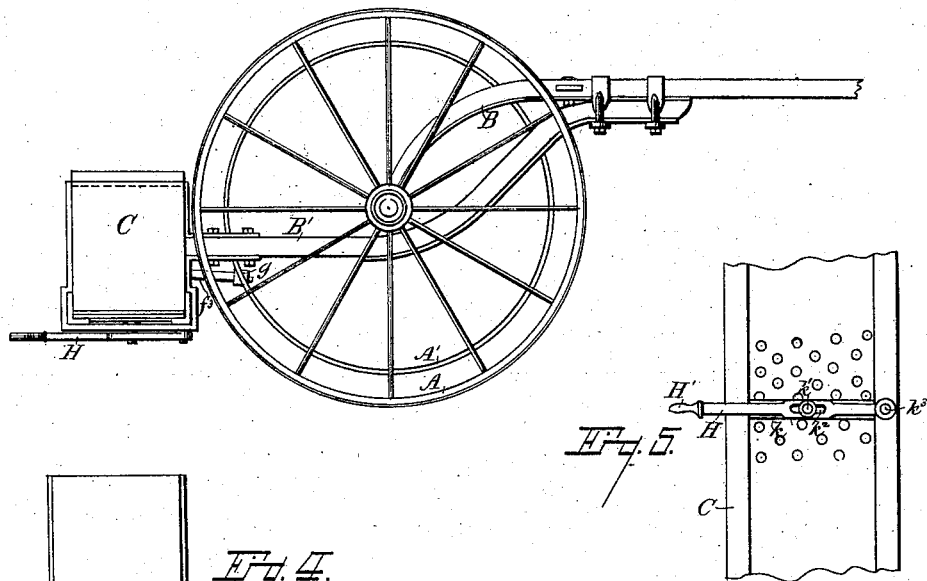
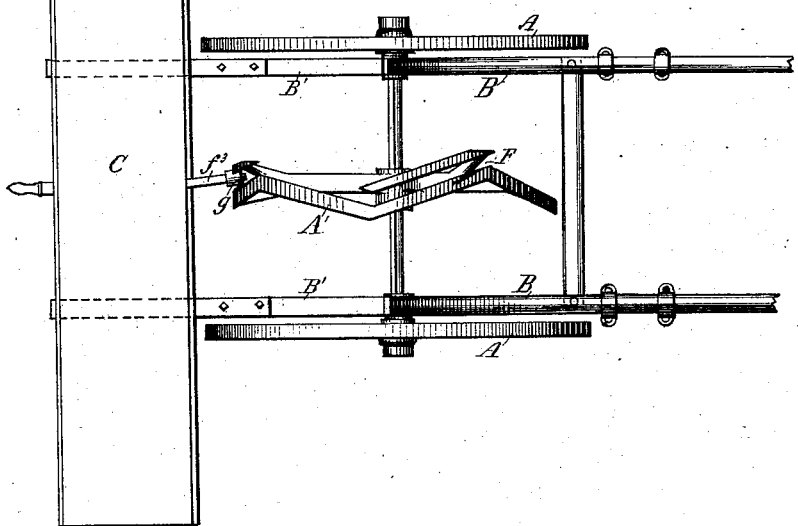

UNITED STATES PATENT OFFICE.

ANDREW JOHNSON, OF MILWAUKEE, WISCONSIN.

MACHINE FOR DISTRIBUTING FERTILIZERS.

SPECIFICATION forming part of Letters Patent No. 302,143, dated July 15, 1884.

Application filed February 19, 1884. (No model.)

*To all whom it may concern:*

Be it known that I, ANDREW JOHNSON, of Milwaukee, in the county of Milwaukee, and in the State of Wisconsin, have invented certain new and useful Improvements in Machines for Distributing Fertilizers, &c.; and I do hereby declare that the following is a full, clear, and exact description thereof.

My invention relates to machines for distributing fertilizers and sowing small grain, and will be fully described hereinafter.

In the drawings, Figure 1 is a top view of my machine. Fig. 2 is a cross-section on line $x\ x$ of Fig. 1. Fig. 3 is a side view of my two-wheeled machine. Fig. 4 is a plan view of the same, and Figs. 5 and 6 are details.

A is the wheel that carries the machine, of which there is but one in a hand machine, Figs. 1 and 2, while in a horse machine there are two, A A, Figs. 3 and 4.

B B are the side bars, and C is the box for containing the fertilizer or grain, and this is suspended from the side bars by the arms B', as will be fully explained hereinafter. The box C has a fixed perforated bottom, $c$, and above this, in a rabbet formed in the lower edge of each of the sides of said box, is inserted a rail, $d$, and these rails are connected by the wires $d'\ d'$, that pass from one rail to the other at right angles. Extending from the first wire at one end of the box to the wire at the other end is a rail, D, which is fixed to the center of said wires, and which carries in its own center a bar, D', that is cogged on both edges, as shown in Fig. 1.

E is a stirrup that extends from one side of the box to the other, and from the under side of said stirrup are suspended the cogged segments $f\ f'$ on pivots $f^2$, and from segment $f'$ a handle, $f^3$, projects back toward the wheel, its free end preferably carrying a roller, $g$, to engage with cams F on the wheel A, so that as the wheel revolves, its cams will shift the free end of the handle to and fro, to enable the wires $d'$ to cut the fertilizer and agitate it, so as to cause it to drop through the perforations of the bottom of the box C. Just underneath said bottom $c$, I hang a perforated plate, $c'$, on supports $c^2$, and this rests loosely enough in its place for it to be moved back and forward for a distance equal to the diameter of its perforations, which, when the ends of said plate $c'$ and the ends of the bottom $c$ are flush with each other, coincide with the perforations in said bottom $c$. On the under side of the box C is pivoted a lever, H, the handle H' of which extends out over a quadrant, H², and between the quadrant H² and the box C a wire or rod, J, is attached to the lever H and extends to one end of the box, where it is secured to one end of another lever, J', that is pivoted to that end of the plate $c'$ by a lug, $i$, and is fulcrumed to the box by another lug, $i'$, while its end beyond the lug $i'$ is connected to the inner end of the lever H by a rod, J², so that when the handle of the lever is moved to one side it will slide the plate $c'$ and either increase or decrease the size of the perforations; but instead of two levers and their connecting-rods, I may use only one, as shown in Fig. 5. In this case I provide across the under side of the box C a bar, $k$, which carries the bearing headed pin $k'$, over which plays the lever H, provided with the slot $k^2$, and hinged on the inner side of the box at $k^3$.

In Figs. 3 and 4 I have shown my device hung between two wheels and to be drawn by an animal. In this case I make the tires of the wheels A A plain, and place a cam-wheel, A', between them. To properly distribute the weight of the box, I secure it to arms B', that extend from the end of the side bars, B, opposite the handles, beneath the axle, and toward the handles, so far that the greatest length of the arms will be forward of the axle; or, as in Fig. 3, I suspend the box in the rear of the shafts by arms attached to them just forward of the cross-bar, the greatest length of the arms being forward of the axle.

Having thus described my invention, what I claim as new, and desire to secure by Letters Patent, is—

1. In a fertilizer and seed distributer, the box C, having a perforated bottom, $c$, in combination with the rails $d\ d$, connected by the wires $d'\ d'$, a central rail, D, the cogged bar D', and the pivoted cogged segments $f$ and $f'$, this last having handle $f^3$, to engage with the cam-wheel A, substantially as shown and described, and for the purpose set forth.

2. In a machine for distributing fertilizers, the supporting-arms B' and the box C, attached to the rear of said arms, in combination with the side bars, B, secured to the forward ends of the arms B', and the wheel or wheels A, located between the point of union of the parts B B' and the box C.

3. In a machine for distributing fertilizers, the combination of the wheel or wheels A and cams F with the supporting-arms B' and box C, suspended from the rear of said arms, and having sliding frames and connections, substantially as described, for reciprocating the same from the cams F, and the side bars, B, connected to the front ends of the arms B' in front of the wheels A, substantially as described.

In testimony that I claim the foregoing I have hereunto set my hand, at Milwaukee, in the county of Milwaukee and State of Wisconsin, in the presence of two witnesses.

ANDREW JOHNSON.

Witnesses:
 STANLEY S. STOUT,
 H. G. UNDERWOOD.